(12) United States Patent
Kim et al.

(10) Patent No.: US 8,205,220 B2
(45) Date of Patent: Jun. 19, 2012

(54) OPTICAL DISC DRIVE WITH SHIELDING MEMBER TO PREVENT ENTRY OF DUST

(75) Inventors: Tae Myun Kim, Yongin-si (KR); Jae Yong Eum, Suwon-si (KR); Hong Kyun Yim, Suwon-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 997 days.

(21) Appl. No.: 12/146,513

(22) Filed: Jun. 26, 2008

(65) Prior Publication Data
US 2009/0133044 A1    May 21, 2009

(30) Foreign Application Priority Data
Nov. 16, 2007 (KR) .................. 10-2007-0117096

(51) Int. Cl.
G11B 33/14 (2006.01)
G11B 33/02 (2006.01)
G11B 17/03 (2006.01)

(52) U.S. Cl. .................. 720/648; 720/601; 720/646

(58) Field of Classification Search .................. 720/601, 720/602, 610–613, 646–648, 654–657
See application file for complete search history.

(56) References Cited

U.S. PATENT DOCUMENTS

| | | | |
|---|---|---|---|
| 5,265,072 A | 11/1993 | Numata et al. | |
| 6,198,712 B1 | 3/2001 | Okamoto | |
| 6,567,361 B1 * | 5/2003 | Ohmori | 720/648 |
| 2004/0081056 A1 * | 4/2004 | Huang et al. | 369/75.2 |
| 2004/0107425 A1 * | 6/2004 | Huang | 720/610 |
| 2005/0028175 A1 | 2/2005 | Lin | |
| 2005/0102690 A1 * | 5/2005 | Huang | 720/649 |
| 2005/0235301 A1 * | 10/2005 | Chuang | 720/647 |
| 2006/0225086 A1 * | 10/2006 | Yen | 720/650 |

FOREIGN PATENT DOCUMENTS

| | | |
|---|---|---|
| JP | 8-255474 | 10/1996 |
| JP | 10-21679 | 1/1998 |
| JP | 2000011510 | 1/2000 |
| JP | 2001266441 | 9/2001 |
| JP | 2003141865 | 5/2003 |
| KR | 10-1999-006710 A | 1/1999 |
| KR | 20020059532 | 7/2002 |
| WO | 9636966 | 11/1996 |

OTHER PUBLICATIONS

Machine-Assisted Translation of JP 2000011510 A.*
European Search Report issued Feb. 24, 2009 in European Application No. 08162568.3.
Korean Office Action issued Oct. 20, 2008 in KR 2007-0117096.

* cited by examiner

Primary Examiner — Nathan Danielsen
(74) Attorney, Agent, or Firm — Stanzione & Kim, LLP (57) ABSTRACT

An optical disc drive to prevent entry of dust through a front side of a tray and includes a housing including a first opening, a shielding member disposed to shield the first opening at a distance from a front side of the housing, and including a second opening, and a tray inserted in the first and the second openings to shield the second opening and loaded into and unloaded from the housing. Thus, since sponge or padding is not dedicatedly used, cost can be saved. In addition, since the manufacturing process is simplified, productivity can be improved.

13 Claims, 7 Drawing Sheets

FIG. 1

(CONVENTIONAL)

OPTICAL DISC DRIVE WITH SHIELDING MEMBER TO PREVENT ENTRY OF DUST

CROSS-REFERENCE TO RELATED APPLICATIONS

This application claims priority under 35 U.S.C. §119(a) from Korean Patent Application No. 2007-117096, filed on Nov. 16, 2007, in the Korean Intellectual Property Office, the disclosure of which is incorporated herein in its entirety by reference.

BACKGROUND OF THE INVENTION

1. Field of the Invention

The present general inventive concept relates to an optical disc drive, and more particularly to an optical disc drive to prevent entry of dust through a tray that carries a disc.

2. Description of the Related Art

Generally, optical disc drives indicate apparatuses that record and reproduce data by projecting a light beam on a recording medium having a disc form, such as a CD (Compact Disc), a DVD (Digital Versatile Disc) and a BD (Blue-ray Disc). The recording medium will be referred to merely as a 'disc' hereinbelow.

The optical disc drive includes a housing constituting an exterior of the optical disc drive, and a tray loaded to and unloaded from an inside of the housing. A disc seating surface is formed on an upper surface of the tray to seat the disc thereon. The disc is carried into the housing, as seated on the disc seating surface. The housing includes a deck assembly mounted therein. The deck assembly includes a spindle motor for rotating the disc carried into the housing, and an optical pickup device to record and reproduce data by projecting a light beam onto the rotating disc.

Figure 1:
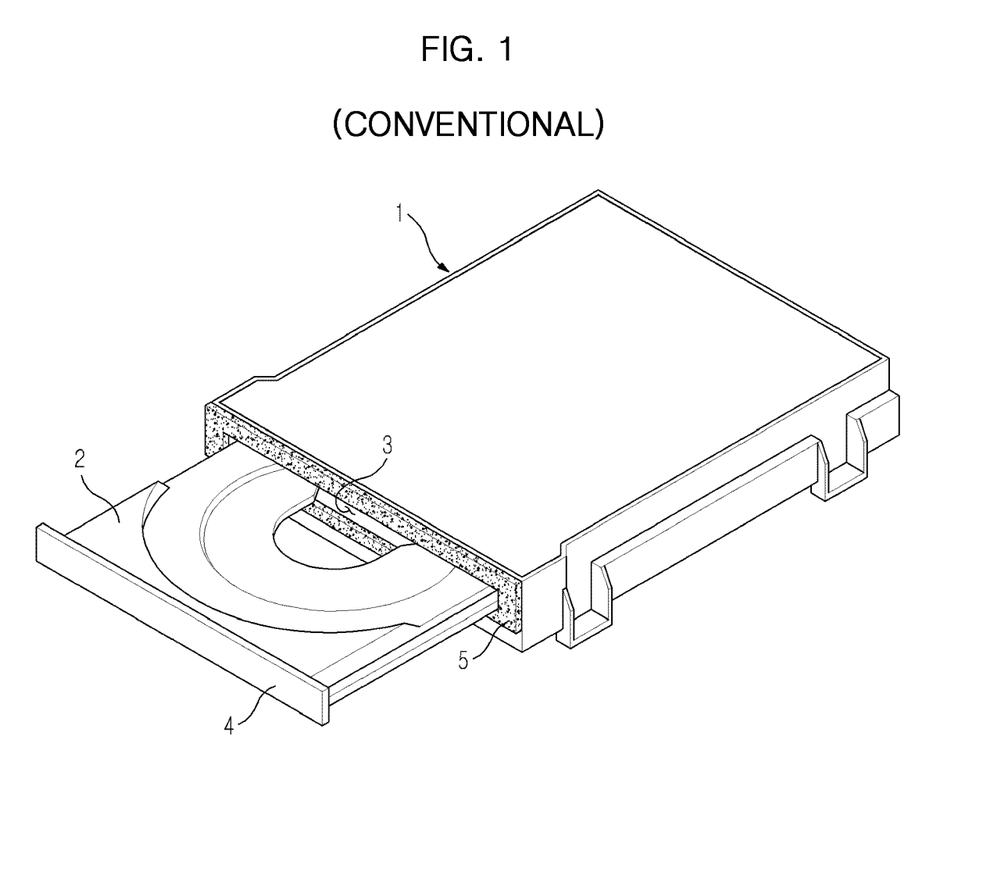
FIG. 1 is a perspective view illustrating an exterior of a conventional optical disc drive.

FIG. 1 is a perspective view illustrating an exterior of a conventional optical disc drive.

Referring to FIG. 1, an opening 3 is formed on a front of a housing 1 to insert a tray 2 therethrough. A front plate 4 in a plate form is provided to a front end of the tray 2. Here, the front plate 4 is formed to have a larger area than the opening 3. When the tray 2 is loaded into the housing 2, the front plate 4 covers the opening 3, thereby hermetically closing an inside of the housing 1.

In the state where the front plate 4 covers the opening 3, however, a gap exists between the front plate 4 and a front side of the housing 1, allowing entry of dust into the housing 1. Dust that entered the housing 1 may affect an operation of the optical disc drive. For example, when dust is attached to an object lens of the optical disc drive, reading and recording of data with the disc may not be correctly performed.

To solve this problem, an elastic member 5 has been used to remove the gap between the front plate 4 and the front side of the housing 1 by being inserted in the gap. Elastically contracted and expanded materials, such as sponge or padding, are used for the elastic member 5. The elastic member 5 is attached to the front side of the housing 1 along an outline of the opening 3. When the tray 2 is loaded into the housing 1, the front plate 4 is brought into tight contact with the elastic member 5, thereby sealing the gap between the front plate 4 and the front side of the housing 1. According to this, entry of dust into the housing 1 can be prevented. Japanese Patent Laid-open No. 10-21679 relates to an optical disc drive preventing entry of dust by using such an elastic member.

However, adoption of the elastic member 5 like the sponge or padding, attached to the front side of the housing 1 to prevent entry of dust, bears some problems. The dedicated material for the elastic member 5 causes an increase of the material cost. Furthermore, by adding a manufacturing process for attaching the elastic material 5 to the front side of the housing 1, productivity of the optical disc drive is deteriorated.

SUMMARY OF THE INVENTION

The present general inventive concept provides an optical disc drive to prevent entry of dust into a housing by further shielding a front side of the housing.

Additional aspects and/or utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an optical disc drive including a housing including a first opening, a shielding member disposed to shield the first opening, being spaced apart from a front side of the housing, and including a second opening, and a tray insertable in the first and the second openings to shield the second opening and to be loaded into and unloaded from the housing.

When the tray is loaded into the housing, the shielding member may be bent by the tray, thereby shielding the first opening.

The shielding member may be bent and brought into contact with the housing.

The shielding member may include a cut surface to achieve a surface-contact with the housing.

The shielding member may include a wing portion which is bent to enclose the housing.

The shielding member may be integrally formed with the housing.

The shielding member may include a protruding portion to protrude from the housing, and a bent portion to bend from the protruded portion.

A connection portion between the protruded portion and the bent portion may be curved so as to prevent concentration of a stress thereon when the shielding member is bent.

The tray may include a front plate having a greater area than the second opening, and the front plate tightly contacts with the shielding member as the tray is loaded into the housing to shield the second opening.

The front plate may be tilted to tightly contact with the shielding member when the shielding member is bent.

The shielding member may include a seating groove formed along an outline of the second opening, and the front plate may shield the second opening by tightly contacting with the seating groove.

The tray may include a disc seating portion to seat thereon a disc which is a recording medium, and the disc seating portion may include a rib disposed in a gap between the tray and the first opening.

The rib may be formed at an upper or lower surface of the disc seating portion.

The foregoing and/or other aspects and utilities of the general inventive concept may also be achieved by providing an optical disc drive including a housing including a first opening, a tray to be inserted in the first opening and to be loaded into and unloaded from the housing, and a shielding member to protrude integrally from the tray, wherein, when the tray is loaded into the housing, the shielding member is bent by the first opening to shield the first opening.

The shielding member may protrude from an upper surface and a lower surface of the tray.

The optical disc drive may further include a rib formed at the tray to fill up a gap between the tray and the first opening as the tray is loaded into the housing.

The rib may protrude at the upper or lower surface of the tray.

The shielding member may have a greater height than the rib.

The foregoing and/or other aspects and utilities of the general inventive concept may also be achieved by providing an optical disc drive increasing a housing including a front portion and an opening, a tray having a front plate to form an angle with the front portion of the housing, and to transport a disc into and from the housing through the opening, wherein at least one of the front portion of the housing and the front plate of the tray bend when in contact with each other to form and maintain a seal.

The foregoing and/or other aspects and utilities of the general inventive concept may also be achieved by providing an optical disc drive including a housing including a front portion and an opening, a tray to transport a disc into and from the housing through the opening, an upper shielding member extending upward from the tray, and a lower shielding member extending downward from the tray, wherein the upper shielding member and the lower shielding member bend when in contact with the front portion of the housing to form and maintain a seal with each other.

BRIEF DESCRIPTION OF THE DRAWINGS

These and/or other aspects and utilities of the exemplary embodiments of the present general inventive concept will become apparent and more readily appreciated from the following description of the embodiments, taken in conjunction with the accompanying drawings, of which.

DETAILED DESCRIPTION OF THE PREFERRED EMBODIMENTS

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Figure 2:
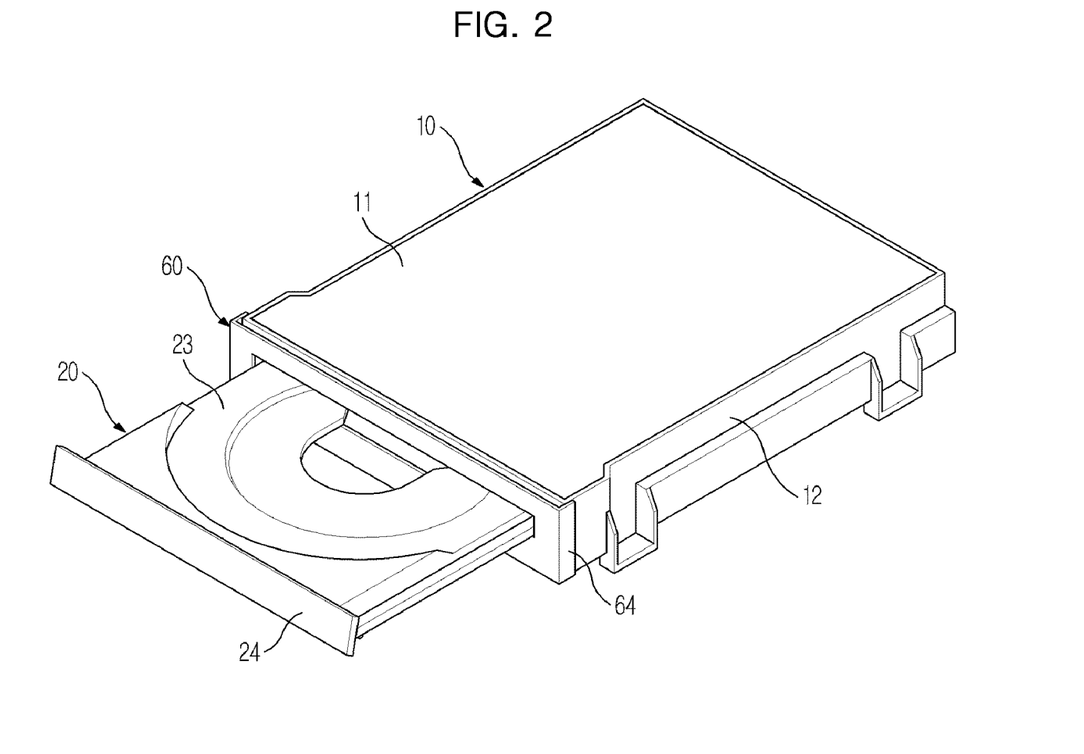
FIG. 2 is a perspective view illustrating an exterior of an optical disc drive according to an embodiment of the present general inventive concept.
Figure 3:
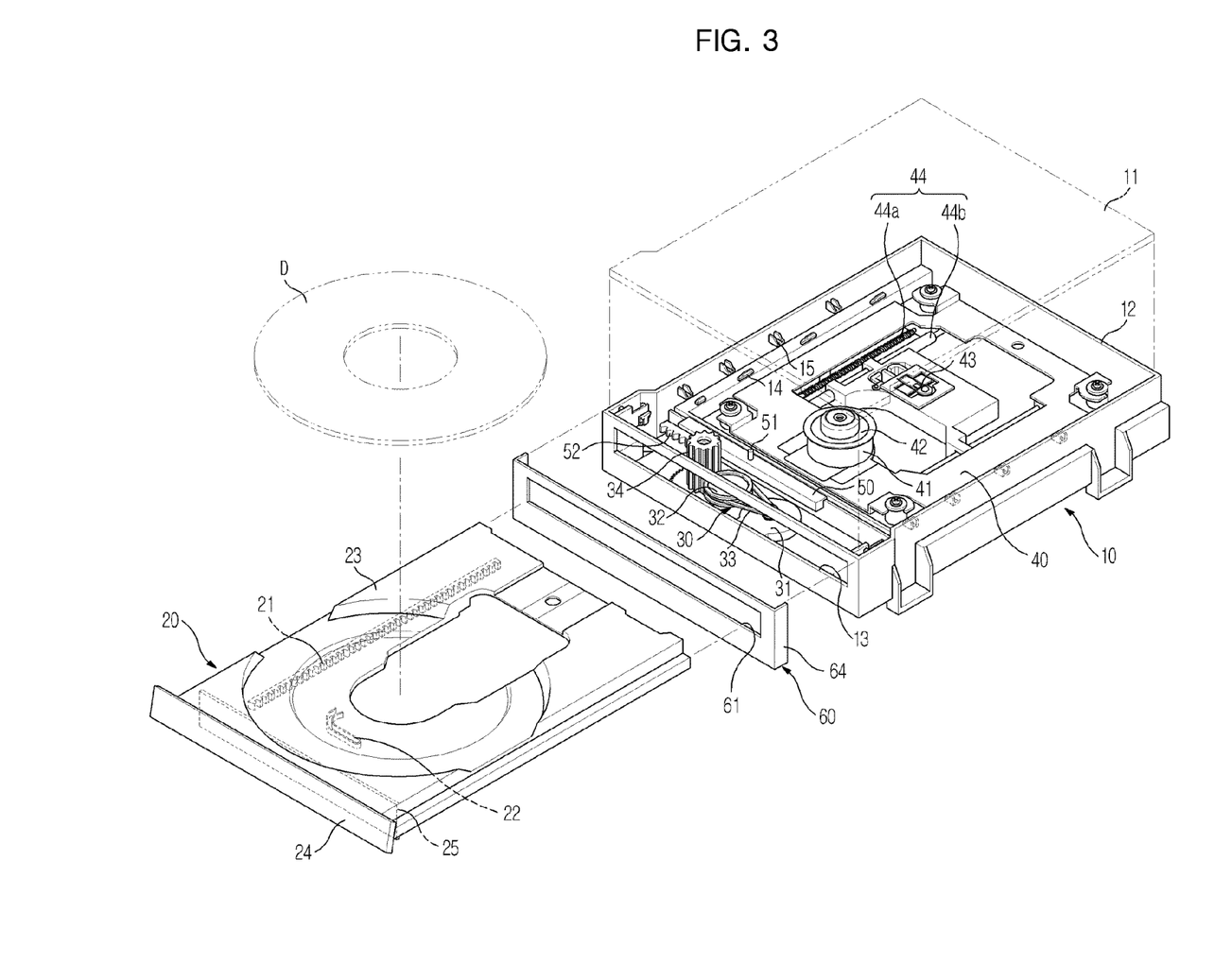
FIG. 3 is a perspective view illustrating a structure of the optical disc drive illustrated in FIG. 2.

FIGS. 2 and 3 are perspective views illustrating an exterior and the structure, respectively, of an optical disc drive according to an embodiment of the present general inventive concept.

As illustrated in FIGS. 2 and 3, the optical disc drive according to the embodiment of the present general inventive concept includes a housing 10 constituting the exterior, and a tray 20 to load and unload a disc D to and from the housing 10. The housing 10 is divided into a cover frame 11 disposed at an upper portion and a main frame 12 disposed at a lower portion. On a front surface of the housing 10, a first opening 13 is formed for the tray 20 to be inserted and slid therethrough.

A shielding member 60 is provided in front of the housing 10. More specifically, being spaced apart from the front side of the housing 10, the shielding member 60 protects the first opening 13 from external dust. A second opening 61 is formed at the shielding member 60 so that the tray 20 can be inserted and slid therethrough. Since the second opening 61 is arranged parallel with the first opening 13, the tray 20 is inserted through the first and the second openings 13 and 61 to be loaded into and unloaded from the housing 10. The shielding member 60 will be described hereinafter in greater detail with reference to FIGS. 4 through 6.

Referring to FIG. 3, an internal structure of the housing 10 will be described first. A loading device 30 to supply power to slide the tray 20 is mounted to a front bottom surface of the main frame 12. The loading device 30 includes a loading motor 31, a pulley 32 to transmit power of the loading motor 31 to the tray 20, and a belt 33 and a pinion gear 34. A rack gear 21 meshed with the pinion gear 34 is formed at one side of a bottom of the tray 20. The tray 20 can be reciprocated in a linear motion through the pinion gear 34 and the rack gear 21.

A deck assembly 40 including assorted component portions to record and reproduce operations of the disc D is hinged in the main frame 12, pivotably in a vertical direction. The deck assembly 40 is mounted with a turn table 42 to seat thereon the disc D carried into the main frame 12 and rotated by a spindle motor 41, and an optical pickup device 43 recording data on the disc D and reproducing the recorded data from the disc D. The optical pickup device 43 projects a light beam to a recording surface of the disc D, while moving in a radial direction of the disc D. For this operation, the deck assembly 40 includes an optical pickup transfer device 44 including a screw 44a, a driving motor (not illustrated), a guide shaft 44b, and a gear (not illustrated).

A sliding cam 50 is mounted between the deck assembly 40 and the loading device 30. The sliding cam 50 includes a sliding protrusion 51 and a rack gear 52. The sliding protrusion 51 operates in association with a guiding groove 22 formed at a bottom surface of the tray 20, and the rack gear 52 with the pinion gear 34 of the loading device 30. While the tray 20 is being loaded and unloaded, the sliding cam 50 reciprocates laterally in a sliding manner, thereby causing an up and down motion of the deck assembly 40.

Pluralities of guide rails 14 and protrusions 15 are formed on both sides of a bottom of the main frame 12 and on both inner lateral sides, respectively, to guide a sliding motion of the tray 20.

Figure 4:
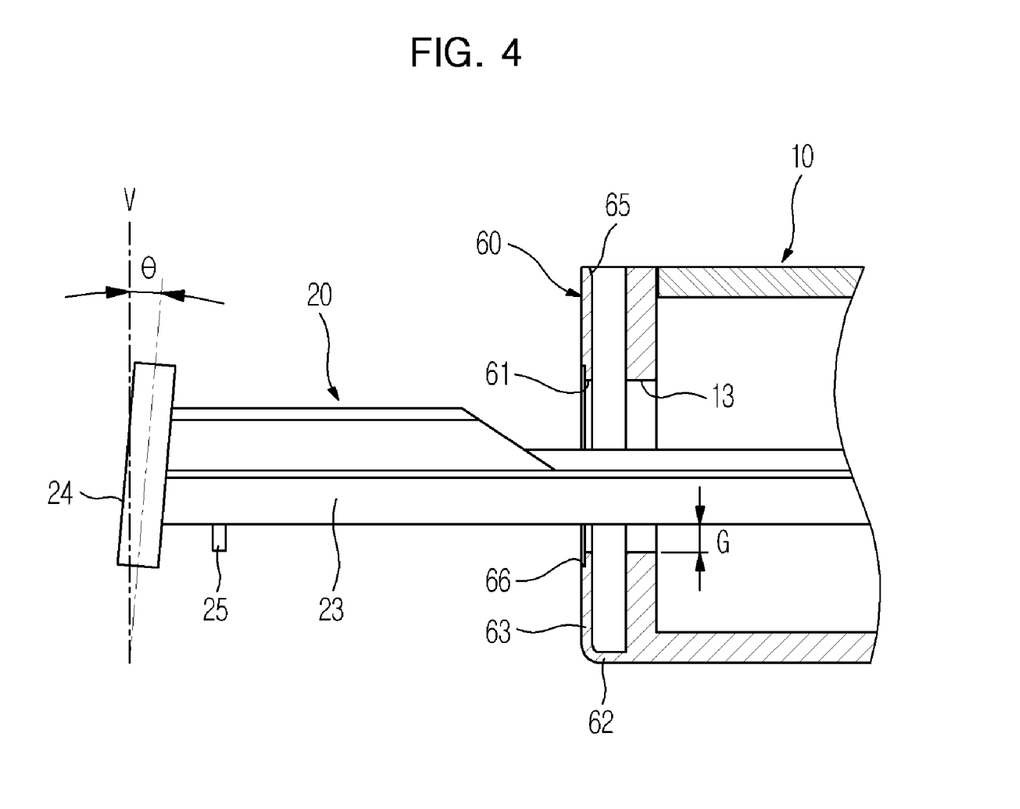
FIG. 4 is a sectional view illustrating the optical disc drive in a state where a tray according to the embodiment illustrated in FIG. 2 is unloaded.

FIG. 4 is a sectional view illustrating the optical disc drive when the tray 20 according to the embodiment illustrated in FIG. 2 is unloaded.

As illustrated in FIG. 4, the shielding member 60 is integrally formed with the housing 10. More specifically, the shielding member 60 includes a protruded portion 62 protruded from a lower front of the housing 10, and a bent portion 63 bent upwardly from the protruded portion 62. Referring together to FIG. 3, the shielding member 60 further includes wing portions 64 extended from both lateral sides of the bent portion 63 toward the housing 10. The bent portion 63 of the shielding member 60 is spaced apart from the front side of the housing 10 and the protruded portion 62 is in connection with the front side of the housing 10. Therefore, the shielding member 60 can bend toward the front of the housing 10. When the shielding member 60 is bent, a stress may be concentrated on a connection portion between the bent portion 63 and the protruded portion 62. Such a stress concentration can be solved by curving the connection portion between the bent portion 63 and the protruded portion 62.

The tray 20 includes a disc seating portion 23 on which the disc D (FIG. 3) is seated, and a front plate 24 having a plate form and disposed at a leading end of the disc seating portion 23. The front plate 24 has a larger area than the second opening 61 to be able to cover the second opening 61. When the tray 20 is loaded into the housing 10, the front plate 24 is brought into tight contact with the shielding member 60, thereby shielding the second opening 61.

Figure 5:
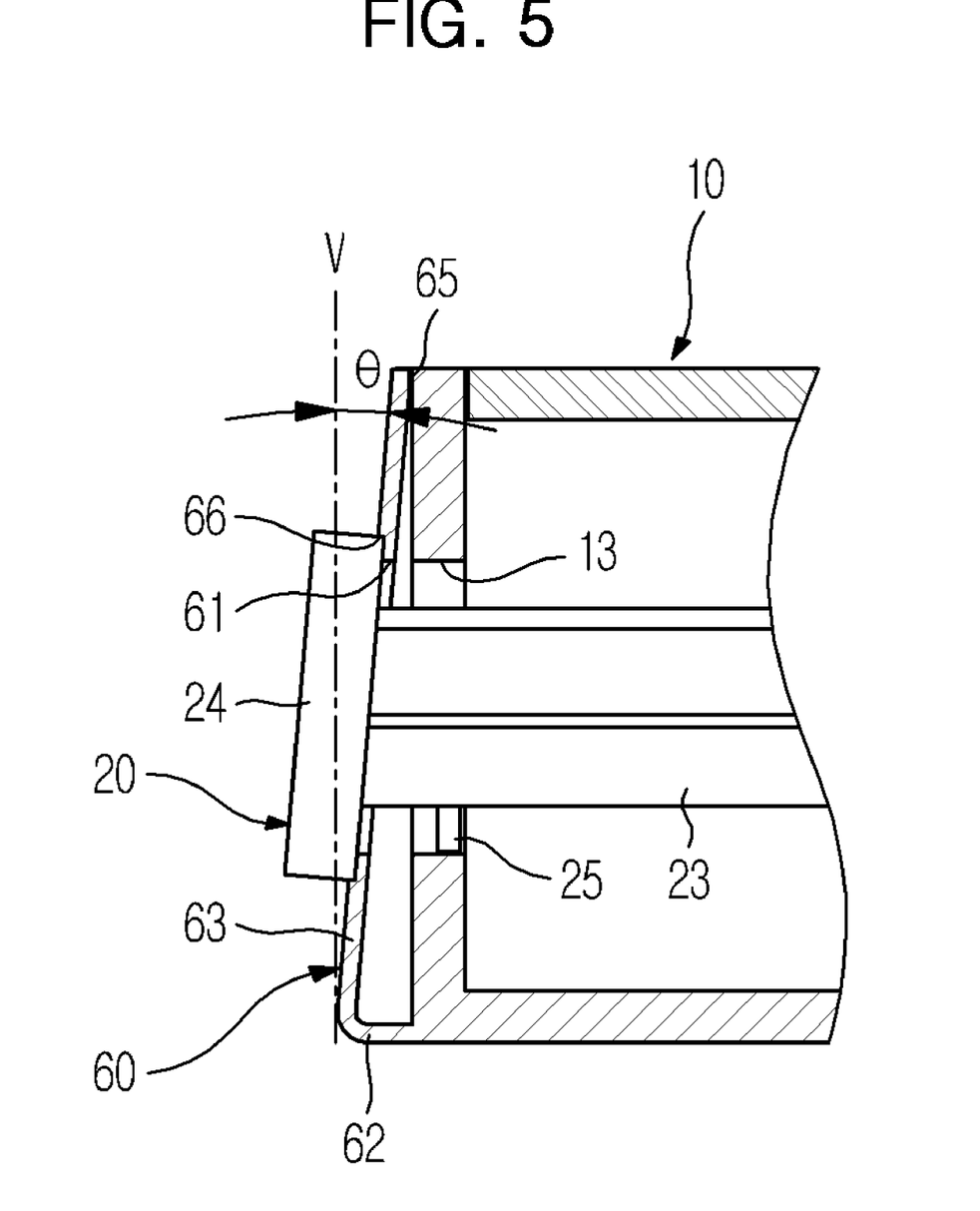
FIG. 5 is a sectional view illustrating the optical disc drive in a state where a tray according to the embodiment illustrated in FIG. 2 is loaded.

The front plate 24 is tilted by a predetermined angle θ which is the same as an angle by which the shielding member 60 is bent, as illustrated in FIG. 5. The front plate 24 is tilted clockwise with respect to a vertical axis V in the drawing, that is, in a same direction the shielding member 60 is bent in. The shielding member 60 is bent as the front plate 24 presses the shielding member 60. More particularly, when the tray 20 is loaded into the housing 20, an upper end of the front plate 24 presses the shielding member 60. If the front plate 24 is tilted counterclockwise with respect to the vertical axis V, a lower end of the front plate 24 first presses the shielding member 60. That is, depending on the tilting direction of the front plate 24 with respect to the vertical axis V, positions of the shielding member 60 pressed by the upper end and the lower end of the front plate 24 are varied. Here, a greater moment can be obtained when the upper end of the front plate 24 presses the shielding member 60 than when the lower end presses the shielding member 60, thereby bending the shielding member 60 more easily. Furthermore, in this case, overloading at the loading motor 31 can be prevented.

FIG. 5 is a sectional view illustrating the optical disc drive when the tray 20 according to the embodiment illustrated in FIG. 2 is loaded.

As illustrated in FIG. 5, as the tray 20 is loaded into the housing 10, the tray 20 bends the shielding member 60 and accordingly the shielding member 60 shields the first opening 13. A space between the shielding member 60 and the front side of the housing 10 will be described in further detail, as divided into upper, lower, and both lateral spaces.

At the upper space, an upper end of the bent portion 63 is contacting with the front side of the housing 10. Here, because entry of dust can be reduced more effectively as the contacting area increases, a cut surface 65 is formed at an upper end of the bent portion 63 so that the upper end of the bent portion 63 is in surface-contact with the front side of the housing 10. At the lower space, the protruded portion 62 is disposed between the bent portion 63 and the front side of the housing 10. The protruded portion 62, being integrally formed with the housing 10 and the bent portion 63, shields the lower space. At the both lateral spaces, the wing portions 64 are extended from the bent portion 63 toward the housing 10. Referring to FIG. 2, the wing portions 64 enclose the lateral sides of the housing 10, thereby shielding the lateral spaces.

The second opening 61 formed at the shielding member 60 is shielded by the tray 20. The bending angle of the shielding member 60 is the same as the tilting angle of the front plate 24. The area of the front plate 24 is greater than the area of the second opening 61. According to this structure, by securely contacting with the shielding member 60, the front plate 24 shields the second opening 61. In addition, a seating groove 66 having a predetermined depth is formed at the shielding member 60 along an outline of the second opening 61. The seating groove 66 partly receives the front plate 24 so that the contact between the front plate 24 and the shielding member 60 can be enhanced.

When the tray 20 is loaded into the housing 10, the front plate 24 shields the second opening 61 and the shielding member 60 shields the first opening 13. Since the shielding member 60 is bendable, the contact with the front side of the housing 10 can be achieved more tightly. In accordance with an improvement of the contact, a sealing between the shielding member 60 and the housing 10 is enhanced. As a result, dust entering the housing 10 through the first opening 13 can be reduced.

Besides the shielding member 60, an additional device is provided to prevent the entry of dust through the opening 13. As illustrated in FIG. 4, a predetermined gap G exists between a bottom surface of the disc seating portion 23 and the first opening 13. Therefore, a rib 25 protruded downward from a bottom of the tray seating groove 66 is provided to fill up the gap G between the bottom surface of the disc seating portion 23 and the first opening 13. As illustrated in FIG. 5, when the tray 20 is loaded into the housing 10, the rib 25 fills up the gap G and therefore, entry of dust through the first opening 13 into the housing 10 is greatly restrained.

Although not illustrated, the rib 25 may be formed at an upper surface of the disc seating portion 23 to fill up a gap between an upper surface of the disc seating portion 23 and the first opening 13. Since this applies the same principle as the rib 25 formed on the bottom surface of the disc seating portion 23, detailed description will be omitted.

Additionally, although not illustrated in the drawings, the rib 25 may be protruded from the first opening 13. In this case as well, entry of dust into the housing 10 can be prevented.

Figure 6:
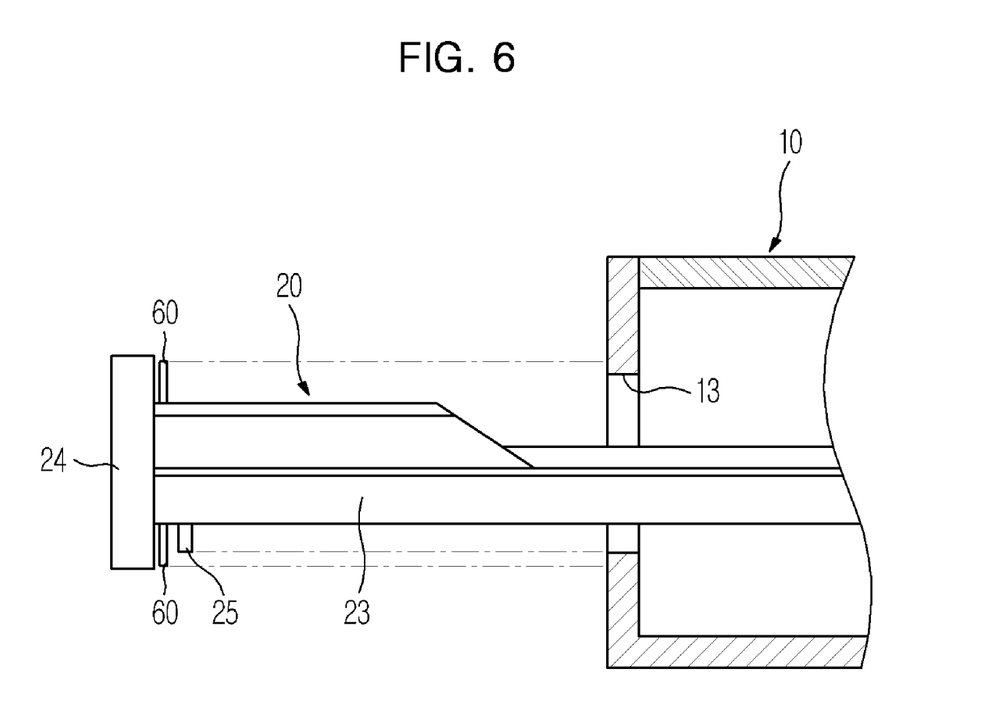
FIGS. 6 and 7 are sectional views illustrating an optical disc drive according to another embodiment of the present general inventive concept.
Figure 7:
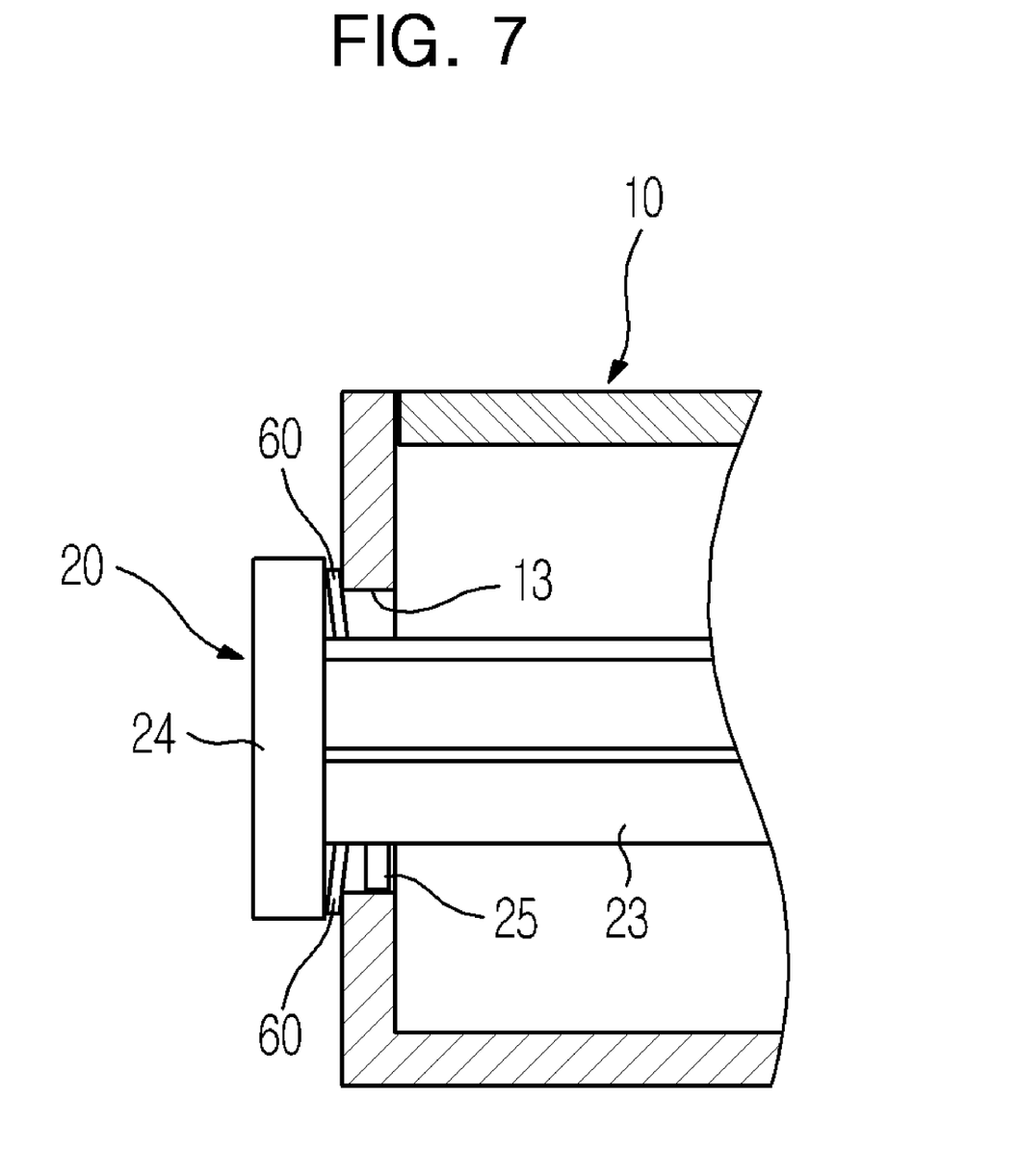

FIG. 6 and FIG. 7 are sectional views illustrating an optical disc drive according to another embodiment of the present general inventive concept.

Referring to FIG. 6, the tray 20 includes the front plate 24 and the disc seating portion 23. The shielding member 60 is protruded upward from an upper front of the disc seating portion 23. Correspondingly, another shielding member 60 is protruded downward from a lower front of the disc seating portion 23 so that the two shielding members 60 face each other. The shielding members 60 are formed integrally with the disc seating portion 23 and thinly so as to be bendable. The shielding member 60 is formed larger than the gap G between the disc seating portion 23 and the first opening 13, so as to be bent by the first opening 13 as the tray 20 is loaded into the housing 10.

As illustrated in FIG. 7, when the tray 20 is loaded into the housing 10, the shielding member 60 is bent and thereby shields the first opening 13. Because the shielding member 60 is bendable, the contact between the shielding member 60 and the front side of the housing 10 can be improved, accordingly sealing the first opening 13 more efficiently. Furthermore, the load of the loading motor 31 (FIG. 3) to load the tray 20 into the housing 10 can be reduced. If the shielding member 60 contacts with the front side of the housing 10 without bending, the load applied to the loading motor 31 would be increased and negatively impact the operation of the optical disc drive.

Additionally, the rib 25 is formed at the bottom surface of the disc seating portion 23 in order to fill up the gap between the disc seating portion 23 and the first opening 13. Alternatively, the rib 25 may be formed at the upper surface of the disc seating portion 23. FIG. 7 shows the rib 25, formed at the bottom surface of the disc seating portion 23, filling the gap between the disc seating portion 23 and the first opening 13.

The shielding member 60 and the rib 25 are protruded from the disc seating portion 23. Here, the shielding member 60 is formed larger than the gap between the disc seating portion 23 and the first opening 13 so as to be bent by the first opening 13. Since the rib 25 is formed to fit the gap between the disc seating portion 23 and the first opening 13, the rib 25 has a length corresponding to the gap. The shielding member 60 has a greater length than the rib 25.

Thus, the first opening 13 is shielded primarily by the shielding member 60 and further by the rib 25. As a consequence, entry of dust into the housing 10 through the opening 13 can be remarkably prevented.

As can be appreciated from the above description, the optical disc drive according to various embodiments of the present general inventive concept can save costs by omitting sponge or padding dedicatedly adopted to prevent entry of dust into the housing.

Since the manufacturing process to attach the sponge or padding is saved, productivity can be improved.

Also, since the shielding member is formed integrally with the housing, a whole manufacturing process is simplified, accordingly improving the productivity.

Because the shielding member is bendable, the sealing is enhanced and accordingly, entry of dust into the housing can be effectively prevented.

When the tray is loaded into the housing, the bendable shielding member helps relieve a load applied to the loading motor.

In addition, by providing the tray with the rib, entry of dust can be further prevented.

Although various embodiments of the present general inventive concept have been illustrated and described, it would be appreciated by those skilled in the art that changes may be made in this embodiment without departing from the principles and spirit of the general inventive concept, the scope of which is defined in the claims and their equivalents.

What is claimed is:

1. An optical disc drive, comprising:
    a housing having a first opening;
    a shielding member disposed to shield the first opening, being spaced in front of a front side of the housing, and having a second opening; and
    a tray insertable in the first and the second openings to shield the second opening and to be loaded into and unloaded from the housing, and when the tray is loaded into the housing, the shielding member is bent by the tray, thereby shielding the first opening.

2. The optical disc drive according to claim 1, wherein the shielding member is bent and brought into contact with the housing.

3. The optical disc drive according to claim 1, wherein the shielding member comprises:
    a cut surface to achieve a surface-contact with the housing.

4. The optical disc drive according to claim 1, wherein the shielding member comprises:
    a wing portion to enclose the housing.

5. The optical disc drive according to claim 1, wherein the shielding member is integrally formed with the housing.

6. The optical disc drive according to claim 1, wherein the shielding member comprises:
    a protruding portion to protrude from the housing; and
    a bent portion to bend from the protruded portion.

7. The optical disc drive according to claim 6, wherein a connection portion between the protruded portion and the bent portion is curved so as to prevent concentration of a stress thereon when the shielding member is bent.

8. The optical disc drive according to claim 1, wherein the tray comprises:
    a front plate having a greater area than the second opening, and
    the front plate tightly contacts with the shielding member as the tray is loaded into the housing to shield the second opening.

9. The optical disc drive according to claim 8, wherein the front plate is tilted to tightly contact with the shielding member when the shielding member is bent.

10. The optical disc drive according to claim 8, wherein the shielding member includes a seating groove formed along an outline of the second opening, and
    the front plate shields the second opening by tightly contacting with the seating groove.

11. The optical disc drive according to claim 1, wherein the tray comprises:
    a disc seating portion to seat thereon a disc which is a recording medium, and
    the disc seating portion includes a rib disposed in a gap between the tray and the first opening.

12. The optical disc drive according to claim 11, wherein the rib is formed at an upper or lower surface of the disc seating portion.

13. An optical disc drive, comprising:
    a housing including a front portion and an opening;
    a tray having a front plate to form an angle with the front portion of the housing, and to transport a disc into and from the housing through the opening; and
    a shielding member having a protruded portion connected to a bottom part of the front portion of the housing and a bent portion spaced in front of the front portion of the housing, such that the bent portion bends towards the front portion when the tray and shielding member contact each other to form and maintain a seal.

* * * * *